Patented Mar. 19, 1940

2,194,295

UNITED STATES PATENT OFFICE 2,194,295

WOOD FILLER

Walter J. Clarke, Chatham, N. J., assignor to Bell Telephone Laboratories, Incorporated, New York, N. Y., a corporation of New York No Drawing. Application December 22, 1937, Serial No. 181,148

4 Claims. (Cl. 134—49)

This invention relates to wood fillers and more particularly to an improved quick-drying wood filler.

The usual type of filler for wood finishes consists of a mixture of inert pigments, such as silica, whiting or china clay incorporated in a vehicle of linseed oil, japan dryer and volatile petroleum thinner. This base filler is thereafter tinted to the desired shade with colors ground in oil or by adding dry earth pigment, such as sienna or umber and not infrequently a small quantity of oil-soluble dye. Such fillers, however, require an extremely long period to air dry and, in addition, a comparatively long period of time is necessary for baking satisfactorily at elevated temperatures. When subjected to an accelerated drying system, there is a tendency for a diffusion of oil or oil-soluble coloring materials into the subsequently applied coating. This procedure softens the coating and lowers its adhesion to the wood.

An object of this invention, therefore, is an improved quick-drying filler which is adaptable to accelerated or air drying.

Another object of this invention is an improved filler which does not affect the adhesion of coating material placed thereover.

In accordance with this invention, these and other objects are obtained in a wood filler by employing an amorphous dehydrated silicon dioxide prepared from silica gel, in combination with silica or other silicious material or calcareous materials, a quick-drying varnish and suitable solvents and thinners. If desired, the filler composition is tinted with various colors which are compatible with it and which are not affected by accelerated drying processes.

A suitable method of forming the composition is to pour the required amount of quick-setting varnish in a mixer, add silica, the amorphous dehydrated impalpable silicon dioxide prepared from silica gel and the desired volatile solvents. The ingredients are thoroughly commingled and a metal soap is sifted into the mixture for the purpose of preventing the precipitation of the coloring material. The tinting colors are then added in an amount to produce a predetermined shade or color. After such a filler composition is dried by an accelerated drying system for a comparatively short period of time, for example, one hour at 150° Fahrenheit in a well-ventilated oven, it is sufficiently dry to permit the immediate application of a protective coating, such as varnish or lacquer.

The dehydrated amorphous impalpable silicon dioxide prepared from silica gel is preferably between 20 per cent to 30 per cent of the silica present in the filler. On applying the filler to a wood surface, the quick-setting varnish prevents the inert filler material from penetrating too deeply into the wood. The silica fills up the pores in the wood and the impalpable silicon dioxide, being of much finer grain structure is embedded in the interstices between the particles of silica to form a composition exhibiting little or no shrinkage, and hence having good filling properties for wood. Other silicious material or calcareous materials, such as talc, which may be employed instead of the silica, function in the same manner as the silica. Volatile solvents are quickly evaporated and the wood surface which is freed from excess filler by the usual wiping processes then is in condition for the application of a final protective coating, such as varnish or lacquer.

A typical example of a filler in accordance with this invention is as follows:

| | Per cent by weight |
|---|---|
| Silica | 49.8 |
| Impalpable dehydrated amorphous silicon dioxide prepared from silica gel | 12.5 |
| Quick-setting oleoresinous varnish | 15.0 |
| Kerosene | 10.0 |
| Mineral spirits | 12.4 |
| Aluminum stearate | .3 |
| | 100.0 |

The required amount of varnish is placed in a suitable mixer, such as a change-can rotary mixer, and portions of the silica, impalpable dehydrated amorphous silicon dioxide prepared from silica gel and thinner are gradually added until the whole is thoroughly and uniformly incorporated. The anti-settling agent, aluminum stearate, is then sifted in and, lastly, tinting colors are added with an adjustment, if necessary, for the shade to a known standard by varying slightly the quantities. For example, if a light-colored walnut finish is desired, the following mixture is added in an amount of approximately 27 per cent by weight of the filler:

| | Per cent by weight |
|---|---|
| Chrome yellow medium in oil | 3.0 |
| Burnt umber in oil | 45.0 |
| Lamp black in oil | 7.7 |
| Burnt sienna in oil | 12.7 |
| Black oil stain | 30.8 |
| | 100.0 |

The quick-drying oleoresinous varnish may be of the synthetic type sold extensively on the market and comprising synthetic resins, for example, of the phenol-modified resin, ester gum or alkyd types. The following is a typical quick-setting oleoresinous varnish:

| | Per cent by weight |
|---|---|
| Oil-soluble phenol formaldehyde resin | 20.6 |
| China-wood oil | 23.32 |
| Heat bodied linseed oil | 5.92 |
| Lead naphthenate drier | .15 |
| Cobalt naphthenate drier | .27 |
| Mineral spirits | 49.72 |
| | 100.00 |

This varnish is prepared by heating the resin and China-wood oil to approximately 565° Fahrenheit until sufficiently bodied (a period of 10-20 minutes), then adding the cold previously heat bodied linseed oil to check polymerization. After cooling with stirring to about 450° Fahrenheit, the mineral spirits are added and, lastly, the metallic drier solutions are added.

The filler prepared in accordance with this invention after the customary wiping operation may be baked for one hour at 150° Fahrenheit and, at the end of this period, it is sufficiently dry and hard to permit immediate application of a coat of varnish. It may also be air-dried in from four to six hours, so that a varnish coat or other protective coating may be applied. A wood panel, such as oak or mahogany, after application of this filler is substantially free of pore holes and its surface is in exceptionally good condition to receive a coat of finishing varnish or lacquer.

While preferred embodiments of this invention have been described, various modifications may be made therein without departing from the scope of the appended claims.

What is claimed is:

1. A filler composition for wood finishes comprising silica, impalpable dehydrated amorphous silicon dioxide prepared from silica gel and a quick-setting varnish, said impalpable dehydrated amorphous silicon dioxide being substantially finer than said silica.

2. A filler composition for wood finishing containing silica and impalpable dehydrated amorphous silicon dioxide prepared from silica gel, the proportion of silicon dioxide being 20 per cent to 30 per cent of the silica present, said impalpable dehydrated amorphous silicon dioxide being substantially finer than said silica.

3. A composition for wood filling containing approximately 50 per cent silica, 12 per cent impalpable dehydrated amorphous silicon dioxide prepared from silica gel, 15 per cent quick-drying oleoresinous varnish, 10 per cent kerosene, 12 per cent mineral spirits, and .3 per cent aluminum stearate, said impalpable dehydrated amorphous silicon dioxide being substantially finer than said silica.

4. A filler composition for wood finishes comprising a powdered material and an impalpable dehydrated amorphous silicon dioxide prepared from silica gel embedded in the interstices of said material, said impalpable dehydrated amorphous silicon dioxide being substantially finer than said material.

WALTER J. CLARKE.